US010355954B2

(12) United States Patent
Zheng et al.

(10) Patent No.: US 10,355,954 B2
(45) Date of Patent: Jul. 16, 2019

(54) DELAY MEASUREMENT METHOD AND DEVICE (71) Applicant: HUAWEI TECHNOLOGIES CO., LTD., Shenzhen, Guangdong (CN)

(72) Inventors: Ren Zheng, Shenzhen (CN); Yining Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/915,631

(22) Filed: Mar. 8, 2018

(65) Prior Publication Data
US 2018/0198696 A1 Jul. 12, 2018

Related U.S. Application Data (63) Continuation of application No. PCT/CN2016/096840, filed on Aug. 26, 2016.

(30) Foreign Application Priority Data

Sep. 9, 2015 (CN) .......................... 2015 1 0570449

(51) Int. Cl.
H04L 12/26 (2006.01)
H04W 24/00 (2009.01)
(Continued)

(52) U.S. Cl.
CPC .......... *H04L 43/0852* (2013.01); *H04L 12/66* (2013.01); *H04L 43/00* (2013.01); *H04L 47/20* (2013.01); *H04W 24/00* (2013.01)

(58) Field of Classification Search
CPC ..... H04L 12/66; H04L 43/00; H04L 43/0852; H04L 47/20; H04W 24/00
See application file for complete search history.

(56) References Cited

U.S. PATENT DOCUMENTS 6,185,188 B1 2/2001 Hasegawa
2003/0091029 A1 5/2003 Jo et al.
(Continued)

FOREIGN PATENT DOCUMENTS

CN 101022369 8/2007
CN 103109501 5/2013
(Continued)

OTHER PUBLICATIONS

International Search Report, dated Dec. 1, 2016, in International Application No. PCT/CN2016/096840 (4 pp.).
(Continued)

*Primary Examiner* — Dung B Huynh
(74) *Attorney, Agent, or Firm* — Staas & Halsey LLP (57) ABSTRACT Embodiments of the present invention provide a delay measurement method and device. The method includes: determining a first delay of a first path; obtaining a first two-way delay of a first two-way path; obtaining a first one-way delay from a third IGW port to a provider/provider edge device; obtaining a second one-way delay from the provider/provider edge device to a first IGW port; determining a second delay, where the second delay is obtained by subtracting the first one-way delay and the second one-way delay from the first two-way delay; and comparing the first delay with the second delay. By means of the foregoing solutions, a one-way delay relationship between delays from the OTT server to different IGWs may be effectively determined, so as to determine a path whose one-way delay is optimal according to the one-way delay relationship.

12 Claims, 4 Drawing Sheets (51) Int. Cl.
*H04L 12/66* (2006.01)
*H04L 12/813* (2013.01)

(56) References Cited

U.S. PATENT DOCUMENTS

| | | | | |
|---|---|---|---|---|
| 2004/0228284 A1* | 11/2004 | Tuinstra | ............ | H04L 41/5009 370/252 |
| 2006/0041673 A1* | 2/2006 | Sturrock | ............ | H04L 41/0896 709/230 |
| 2006/0056429 A1 | 3/2006 | Usukura | | |
| 2006/0193285 A1* | 8/2006 | Roy | ............ | H04L 45/00 370/328 |
| 2007/0250625 A1* | 10/2007 | Titus | ............ | H04L 41/0213 709/224 |
| 2008/0181112 A1* | 7/2008 | Beck | ............ | H04J 3/0632 370/235 |
| 2008/0192636 A1* | 8/2008 | Briscoe | ............ | H04L 47/10 370/236 |
| 2009/0077396 A1* | 3/2009 | Tsai | ............ | G06F 1/3209 713/310 |
| 2009/0217074 A1* | 8/2009 | Nichols | ............ | G01V 1/40 713/401 |
| 2009/0303882 A1* | 12/2009 | Tanaka | ............ | H04L 12/4641 370/237 |
| 2009/0304007 A1* | 12/2009 | Tanaka | ............ | H04L 12/4645 370/395.53 |
| 2010/0002591 A1* | 1/2010 | Mizutani | ............ | H04L 43/0852 370/241.1 |
| 2011/0296006 A1* | 12/2011 | Krishnaswamy | ............ | H04L 45/00 709/224 |
| 2012/0207178 A1* | 8/2012 | Webb, III | ............ | H04L 47/365 370/429 |
| 2013/0132986 A1* | 5/2013 | Mack | ............ | H04L 65/605 725/14 |
| 2013/0136020 A1* | 5/2013 | Chan | ............ | H04L 43/0864 370/252 |
| 2013/0208735 A1 | 8/2013 | Mizrahi et al. | | |
| 2014/0010094 A1* | 1/2014 | Robitaille | ............ | H04L 43/0852 370/252 |
| 2014/0064082 A1* | 3/2014 | Yeung | ............ | H04L 47/125 370/235 |
| 2014/0160990 A1* | 6/2014 | Sachdev | ............ | H04W 24/02 370/259 |
| 2014/0307549 A1* | 10/2014 | Kotecha | ............ | H04W 28/0268 370/235 |
| 2014/0313902 A1* | 10/2014 | Bruner | ............ | H04W 28/0236 370/238 |
| 2014/0323102 A1* | 10/2014 | Lorca Hernando | ............ | H04L 67/2861 455/414.1 |
| 2014/0328205 A1* | 11/2014 | Schrecke | ............ | H04L 43/0894 370/253 |
| 2014/0344727 A1* | 11/2014 | Chaudhry | ............ | H04L 43/0876 715/760 |
| 2015/0023179 A1* | 1/2015 | Stein | ............ | H04L 43/0811 370/241.1 |
| 2015/0036526 A1* | 2/2015 | Mantin | ............ | H04N 21/2402 370/252 |
| 2015/0085664 A1* | 3/2015 | Sachdev | ............ | H04L 41/5019 370/236 |
| 2015/0207712 A1 | 7/2015 | Fang et al. | | |
| 2015/0264551 A1* | 9/2015 | Ko | ............ | H04W 76/14 370/329 |
| 2016/0065435 A1* | 3/2016 | Ito | ............ | H04L 43/0864 375/358 |
| 2016/0119938 A1* | 4/2016 | Frerking | ............ | H04W 72/10 370/316 |
| 2016/0156513 A1* | 6/2016 | Zhang | ............ | H04W 4/70 709/220 |
| 2016/0164760 A1* | 6/2016 | Wakabayashi | ............ | H04L 43/0864 370/252 |
| 2016/0302165 A1* | 10/2016 | Da | ............ | H04W 56/002 |
| 2016/0330012 A1* | 11/2016 | Liu | ............ | H04J 3/0664 |
| 2017/0005741 A1* | 1/2017 | Wu | ............ | H04B 17/364 |
| 2017/0041201 A1* | 2/2017 | Ilyadis | ............ | H04L 43/08 |
| 2017/0156048 A1* | 6/2017 | Zeng | ............ | H04L 29/02 |
| 2017/0302570 A1* | 10/2017 | Liu | ............ | H04L 41/0806 |
| 2017/0359555 A1* | 12/2017 | Irani | ............ | G07C 9/00309 |
| 2018/0077431 A1* | 3/2018 | Wei | ............ | H04L 12/18 |
| 2018/0160291 A1* | 6/2018 | Burgert | ............ | H04W 8/12 |
| 2018/0375760 A1* | 12/2018 | Saavedra | ............ | H04L 45/64 |
| 2019/0014508 A1* | 1/2019 | Eriksson | ............ | H04W 36/0022 |
| 2019/0037071 A1* | 1/2019 | Singh | ............ | H04L 63/0876 |

FOREIGN PATENT DOCUMENTS

| | | |
|---|---|---|
| CN | 103297282 | 9/2013 |
| CN | 105119778 | 12/2015 |
| EP | 2717540 | 4/2014 |

OTHER PUBLICATIONS

Written Opinion of the International Searching Authority, dated Dec. 1, 2016, in International Application No. PCT/CN2016/096840 (9 pp.).
Search Report, dated Oct. 25, 2017, in Chinese Application No. 201510570449.6 (2 pp.).
Office Action, dated Nov. 3, 2017, in Chinese Application No. 201510570449.6 (3 pp.).
Extended European Search Report, dated May 8, 2018, in European Application No. 16843571.7 (5 pp.).
International Search Report dated Dec. 1, 2016 in corresponding International Patent Application No. PCT/CN2016/096840.

* cited by examiner

DELAY MEASUREMENT METHOD AND DEVICE

CROSS-REFERENCE TO RELATED APPLICATIONS

This application is a continuation of International Application No. PCT/CN2016/096840, filed on Aug. 26, 2016, which claims priority to Chinese Patent Application No. 201510570449.6, filed on Sep. 9, 2015. The disclosures of the aforementioned applications are hereby incorporated by reference in their entireties.

TECHNICAL FIELD

Embodiments of the present invention relate to the field of information technologies, and more specifically, to a delay measurement method and device.

BACKGROUND

As an entire network is based on the Internet Protocol (IP), operators need to perform delay measurement on each Internet gateway (IGW) egress, and select an optimal path according to a measurement result, so as to provide better services for users.

In the prior art, delay measurement manners include a one-way measurement and a two-way measurement. If a one-way measurement is performed on a node A and a node B, a one-way delay from the node A to the node B may be measured, or a one-way delay from the node B to the node A may be measured. If a two-way service policy is performed on the node A and the node B, a delay from the node A to the node B then to the node A may be measured, or a delay from the node B to the node A then to the node B may be measured. The one-way measurement requires that two measured nodes are clock-synchronized and support a same measurement protocol. However, in actual deployment, over the top (OTT) servers generally are not managed by operators. Therefore, an IGW and an OTT server may not support a same measurement protocol. The two-way measurement may determine a two-way delay from an IGW to an OTT server then to the IGW, but an optimal path cannot be calculated on the basis of this measurement result. Therefore, how to accurately measure a delay relationship between delays from an OTT server to different IGWs to determine an optimal path is a problem to be resolved urgently.

SUMMARY

Embodiments of the present invention provide a delay measurement method and device, so as to effectively determine a one-way delay relationship between delays from an OTT server to different IGWs, so as to determine a path whose one-way delay is optimal according to information about the one-way delay relationship.

According to a first aspect, an embodiment of the present invention provides a delay measurement method, where the method includes: determining a first delay of a first path, where the first path successively passes through a first Internet gateway IGW port, an over the top OTT server, and a second IGW port; obtaining a first two-way delay of a first two-way path, where the first two-way path successively passes through the first IGW port, the OTT server, a third IGW port, a provider/provider edge device, and the first IGW port, and the second IGW port is different from the third IGW port; obtaining a first one-way delay from the third IGW port to the provider/provider edge device; obtaining a second one-way delay from the provider/provider edge device to the first IGW port; determining a second delay, where the second delay is obtained by subtracting the first one-way delay and the second one-way delay from the first two-way delay; and comparing the first delay with the second delay, so as to determine a delay relationship between a one-way delay of a path from the OTT server to the second IGW port and a one-way delay of a path from the OTT server to the third IGW port.

With reference to the first aspect, in a first possible implementation manner of the first aspect, the first IGW port is different from the second IGW port, and the determining a first delay of a first path includes: obtaining a second two-way delay of a second two-way path, where the second two-way path successively passes through the first IGW port, the OTT server, the second IGW port, the provider/provider edge device, and the first IGW port; obtaining a third one-way delay from the second IGW port to the provider/provider edge device; and obtaining a fourth one-way delay from the provider/provider edge device to the second IGW port, where the first delay $D_1$ is determined by using the following formula: $D_1 = M_2 - S_3 - S_4$, where $M_2$ represents the second two-way delay, $S_3$ represents the third one-way delay, and $S_4$ represents the fourth one-way delay.

With reference to the first aspect, in a second possible implementation manner of the first aspect, the first IGW port is the same as the second IGW port, and the determining a first delay of a first path includes: obtaining a third two-way delay of a third two-way path, where the third two-way path successively passes through the first IGW port, the OTT server, and the first IGW port; and determining that the third two-way delay is the first delay.

With reference to the first aspect or either of the foregoing possible implementation manners of the first aspect, in a third possible implementation manner of the first aspect, the method further includes: sending the delay relationship to a network policy control device, so that the network policy control device determines a routing path of a data packet according to the delay relationship.

According to a second aspect, an embodiment of the present invention provides a delay measurement method, where the method includes: determining a third delay of a third path, where the third path successively passes through a second Internet gateway IGW port, an over the top OTT server, and a first IGW port; obtaining a fourth two-way delay of a fourth two-way path, where the fourth two-way path successively passes through a third IGW port, the OTT server, the first IGW port, a provider/provider edge device, and the third IGW port, and the third IGW port is different from the second IGW port; obtaining a fifth one-way delay from the first IGW port to the provider/provider edge device; obtaining a sixth one-way delay from the provider/provider edge device to the third IGW port; determining a fourth delay, where the fourth delay is obtained by subtracting the fifth one-way delay and the sixth one-way delay from the fourth two-way delay; and comparing the third delay with the fourth delay, so as to determine a delay relationship between a one-way delay of a path from the second IGW port to the OTT server and a one-way delay of a path from the third IGW port to the OTT server.

With reference to the second aspect, in a first possible implementation manner of the second aspect, the second IGW port is different from the first IGW port, and the determining a third delay of a third path includes: obtaining a fifth two-way delay of a fifth two-way path, where the fifth two-way path successively passes through the second IGW port, the OTT server, the first IGW port, the provider/provider edge device, and the second IGW port; and obtaining a seventh one-way delay from the provider/provider edge device to the second IGW port, where the third delay $D_3$ is determined by using the following formula: $D_3=M_5-S_7-S_5$, where $M_5$ represents the fifth two-way delay, $S_7$ represents the seventh one-way delay, and $S_5$ represents the fifth one-way delay.

With reference to the second aspect, in a second possible implementation manner of the second aspect, the second IGW port is the same as the first IGW port, and the determining a third delay of a third path includes: obtaining a sixth two-way delay of a sixth two-way path, where the sixth two-way path successively passes through the first IGW port, the OTT server, and the first IGW port; and determining that the sixth two-way delay is the third delay.

With reference to the second aspect or either of the foregoing possible implementation manners of the second aspect, in a third possible implementation manner of the second aspect, the method further includes: sending the delay relationship to a network policy control device, so that the network policy control device determines a routing path of a data packet according to the delay relationship.

According to a third aspect, an embodiment of the present invention provides a delay measurement device, where the device includes: a determining unit, configured to determine a first delay of a first path, where the first path successively passes through a first Internet gateway IGW port, an over the top OTT server, and a second IGW port; and an obtaining unit, configured to obtain a first two-way delay of a first two-way path, where the first two-way path successively passes through the first IGW port, the OTT server, a third IGW port, a provider/provider edge device, and the first IGW port, and the second IGW port is different from the third IGW port, where the obtaining unit is further configured to obtain a first one-way delay from the third IGW port to the provider/provider edge device; the obtaining unit is further configured to obtain a second one-way delay from the provider/provider edge device to the first IGW port; and the determining unit is further configured to: determine a second delay, where the second delay is obtained by subtracting the first one-way delay and the second one-way delay from the first two-way delay; and compare the first delay with the second delay, so as to determine a delay relationship between a one-way delay of a path from the OTT server to the second IGW port and a one-way delay of a path from the OTT server to the third IGW port.

With reference to the third aspect, in a first possible implementation manner of the third aspect, the first IGW port is different from the second IGW port, and the obtaining unit is further configured to: obtain a second two-way delay of a second two-way path, where the second two-way path successively passes through the first IGW port, the OTT server, the second IGW port, the provider/provider edge device, and the first IGW port, obtain a third one-way delay from the second IGW port to the provider/provider edge device, and obtain a fourth one-way delay from the provider/provider edge device to the second IGW port; and the determining unit is specifically configured to determine the first delay $D_1$ by using the following formula: $D_1=M_2-S_3-S_4$, where $M_2$ represents the second two-way delay, $S_3$ represents the third one-way delay, and $S_4$ represents the fourth one-way delay.

With reference to the third aspect, in a second possible implementation manner of the third aspect, the first IGW port is the same as the second IGW port, and the obtaining unit is further configured to obtain a third two-way delay of a third two-way path, where the third two-way path successively passes through the first IGW port, the OTT server, and the first IGW port; and the determining unit is specifically configured to determine that the third two-way delay obtained by the obtaining unit is the first delay.

With reference to the third aspect or either of the foregoing possible implementation manners of the third aspect, in a third possible implementation manner of the third aspect, the device further includes a sending unit, configured to send the delay relationship to a network policy control device, so that the network policy control device determines a routing path of a data packet according to the delay relationship.

According to a fourth aspect, an embodiment of the present invention provides a delay measurement device, where the device includes: a determining unit, configured to determine a third delay of a third path, where the third path successively passes through a second Internet gateway IGW port, an over the top OTT server, and a first IGW port; and an obtaining unit, configured to obtain a fourth two-way delay of a fourth two-way path, where the fourth two-way path successively passes through a third IGW port, the OTT server, the first IGW port, a provider/provider edge device, and the third IGW port, and the third IGW port is different from the second IGW port, where the obtaining unit is further configured to obtain a fifth one-way delay from the first IGW port to the provider/provider edge device; the obtaining unit is further configured to obtain a sixth one-way delay from the provider/provider edge device to the third IGW port; the determining unit is further configured to determine a fourth delay, where the fourth delay is obtained by subtracting the fifth one-way delay and the sixth one-way delay from the fourth two-way delay; and the determining unit is further configured to compare the third delay with the fourth delay, so as to determine a delay relationship between a one-way delay of a path from the second IGW port to the OTT server and a one-way delay of a path from the third IGW port to the OTT server.

With reference to the fourth aspect, in a first possible implementation manner of the fourth aspect, the second IGW port is different from the first IGW port, and the obtaining unit is further configured to: obtain a fifth two-way delay of a fifth two-way path, where the fifth two-way path successively passes through the second IGW port, the OTT server, the first IGW port, the provider/provider edge device, and the second IGW port, and obtain a seventh one-way delay from the provider/provider edge device to the second IGW port; and the determining unit is specifically configured to determine the third delay $D_3$ by using the following formula: $D_3=M_5-S_7-S_5$, where $M_5$ represents the fifth two-way delay, $S_7$ represents the seventh one-way delay, and $S_5$ represents the fifth one-way delay.

With reference to the fourth aspect, in a second possible implementation manner of the fourth aspect, the second IGW port is the same as the first IGW port, and the obtaining unit is further configured to obtain a sixth two-way delay of a sixth two-way path, where the sixth two-way path successively passes through the first IGW port, the OTT server, and the first IGW port; and the determining unit is specifically configured to determine that the sixth two-way delay obtained by the obtaining unit is the third delay.

With reference to the fourth aspect or either of the foregoing possible implementation manners of the fourth aspect, in a third possible implementation manner of the fourth aspect, the device further includes a sending unit, configured to send the delay relationship to a network policy control device, so that the network policy control device determines a routing path of a data packet according to the delay relationship.

By means of the foregoing technical solutions, a one-way delay relationship between delays from an OTT server to different IGWs may be effectively determined, so as to determine a path whose one-way delay is optimal according to information about the one-way delay relationship.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 3:
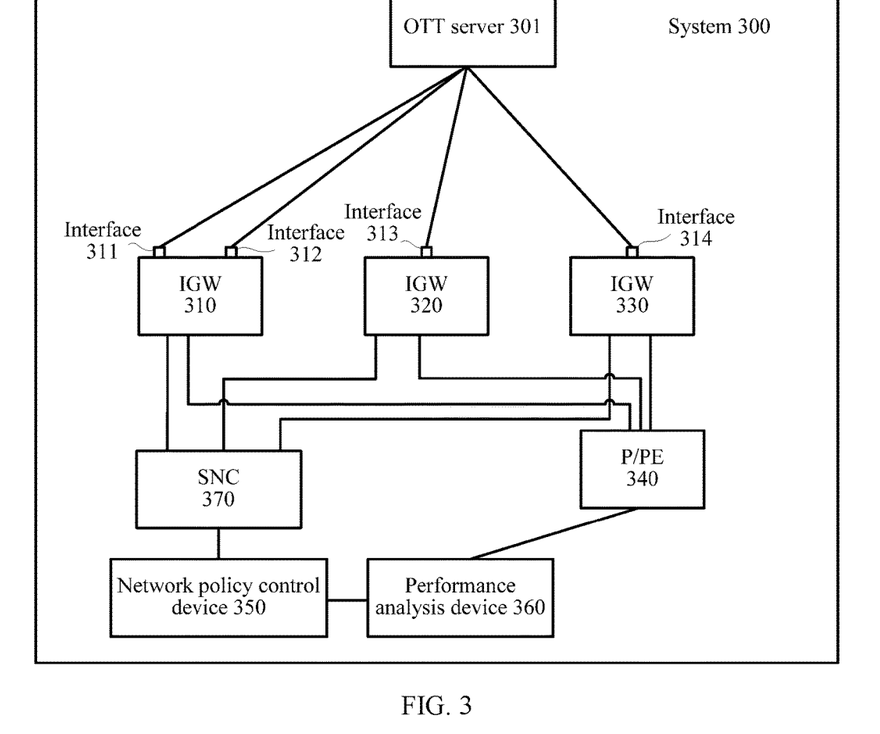
FIG. 3 is a schematic diagram of an all-IP network system.

FIG. 3 is a schematic diagram of an all-IP network system 300. The system 300 shown in FIG. 3 includes an OTT server 301, an IGW 310, an IGW 320, an IGW 330, a provider/provider edge device 340, a performance analysis device 360, a network policy control device 350, and a smart network controller (SNC) 370. The IGW 310 has an interface 311 and an interface 312, the IGW 320 has an interface 313, and the IGW 330 has an interface 314.

A first path may be a path successively passing through the interface 311, the OTT server 301, and the interface 312. A first two-way path may be a path successively passing through the interface 311, the OTT server 301, the interface 313, the provider/provider edge device 340, and the interface 311. A second two-way path may be a path successively passing through the interface 311, the OTT server 301, the interface 312, the provider/provider edge device 340, and the interface 311. A third two-way path may be a path successively passing through the interface 311, the OTT server 301, and the interface 311. A third path may be a path successively passing through the interface 312, the OTT server 301, and the interface 311. A fourth two-way path may be a path successively passing through the interface 313, the OTT server 301, the interface 311, the provider/provider edge device 340, and the interface 313. A fifth two-way path may be a path successively passing through the interface 312, the OTT server 301, the interface 311, the provider/provider edge device 340, and the interface 312.

According to the foregoing example, a person skilled in the art may understand that the first path, the first two-way path, and the like above are only intended to help a person skilled in the art better understand examples of the technical solutions provided in the present invention, but not intended to limit the present invention. A person skilled in the art may further obtain paths such as other first path and first two-way path that are different from those in the foregoing example on the basis of the foregoing example.

Figure 1:
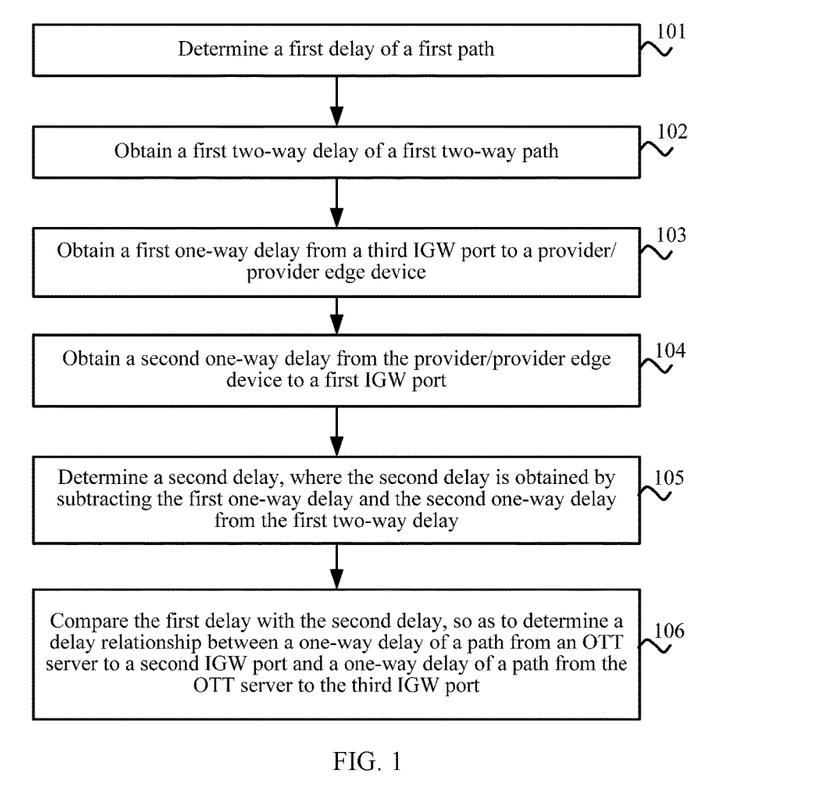
FIG. 1 is a schematic flowchart of a delay measurement method according to an embodiment of the present invention.

FIG. 1 is a schematic flowchart of a delay measurement method according to an embodiment of the present invention.

101: Determine a first delay of a first path, where the first path successively passes through a first IGW port, an OTT server, and a second IGW port.

102: Obtain a first two-way delay of a first two-way path, where the first two-way path successively passes through the first IGW port, the OTT server, a third IGW port, a provider/provider edge (P/PE) device, and the first IGW port, and the second IGW port is different from the third IGW port.

103: Obtain a first one-way delay from the third IGW port to the provider/provider edge device.

104: Obtain a second one-way delay from the provider/provider edge device to the first IGW port.

105: Determine a second delay, where the second delay is obtained by subtracting the first one-way delay and the second one-way delay from the first two-way delay.

106: Compare the first delay with the second delay, so as to determine a delay relationship between a one-way delay of a path from the OTT server to the second IGW port and a one-way delay of a path from the OTT server to the third IGW port.

According to the method shown in FIG. 1, a performance analysis device may effectively determine information about a delay relationship between delays from an OTT server to different IGWs. A network policy control device may determine a path whose one-way delay is optimal according to the information about the delay relationship obtained by the performance analysis device.

Optionally, in an embodiment, the first IGW port is different from the second IGW port, and the determining a first delay of a first path includes: obtaining a second two-way delay of a second two-way path, where the second two-way path successively passes through the first IGW port, the OTT server, the second IGW port, the provider/provider edge device, and the first IGW port; obtaining a third one-way delay from the second IGW port to the provider/provider edge device; and obtaining a fourth one-way delay from the provider/provider edge device to the second IGW port, where the first delay $D_1$ is determined by using the following formula:

$$D_1 = M_2 - S_3 - S_4, \qquad \text{(formula 1.1)}$$

where $M_2$ represents the second two-way delay, $S_3$ represents the third one-way delay, and $S_4$ represents the fourth one-way delay.

Optionally, in another embodiment, the first IGW port is the same as the second IGW port, and the determining a first delay of a first path includes: obtaining a third two-way delay of a third two-way path, where the third two-way path successively passes through the first IGW port, the OTT server, and the first IGW port; and determining that the third two-way delay is the first delay.

Further, the method may further include: sending the delay relationship to a network policy control device, so that the network policy control device determines a routing path of a data packet according to the delay relationship.

Figure 2:
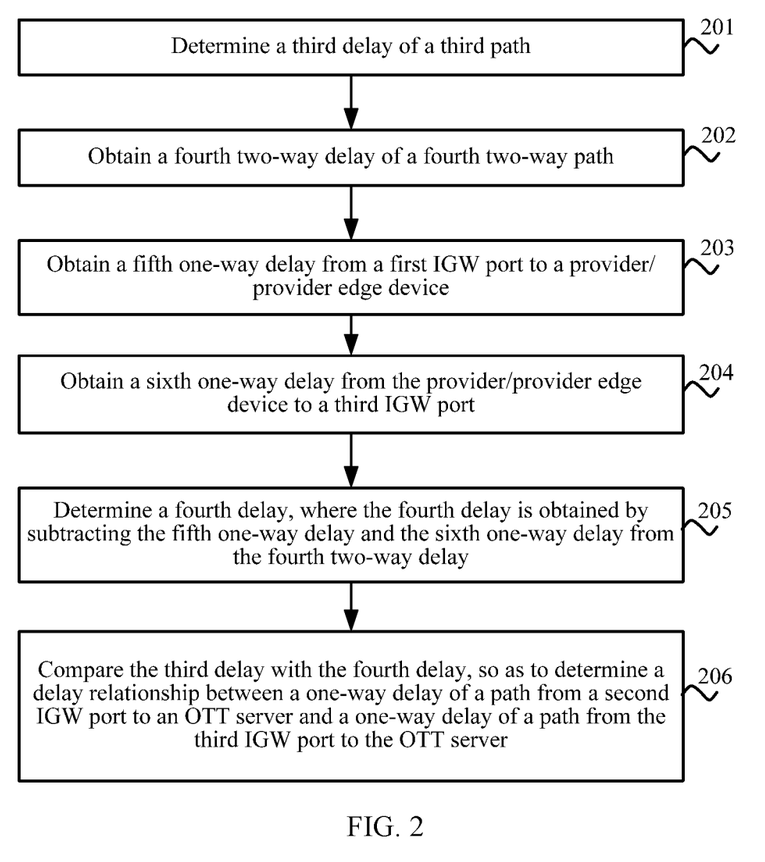
FIG. 2 is a schematic flowchart of another delay measurement method according to an embodiment of the present invention.

FIG. 2 is a schematic flowchart of another delay measurement method according to an embodiment of the present invention.

201: Determine a third delay of a third path, where the third path successively passes through a second IGW port, an OTT server, and a first IGW port.

202: Obtain a fourth two-way delay of a fourth two-way path, where the fourth two-way path successively passes through a third IGW port, the OTT server, the first IGW port, a P/PE device, and the third IGW port, and the third IGW port is different from the second IGW port.

203: Obtain a fifth one-way delay from the first IGW port to the provider/provider edge device.

204: Obtain a sixth one-way delay from the provider/provider edge device to the third IGW port.

205: Determine a fourth delay, where the fourth delay is obtained by subtracting the fifth one-way delay and the sixth one-way delay from the fourth two-way delay.

206: Compare the third delay with the fourth delay, so as to determine a delay relationship between a one-way delay of a path from the second IGW port to the OTT server and a one-way delay of a path from the third IGW port to the OTT server.

According to the method shown in FIG. 2, a performance analysis device may effectively determine information about a delay relationship between delays from different IGWs to a same OTT server. A network policy control device may determine a path whose one-way delay is optimal according to the information about the delay relationship obtained by the performance analysis device.

Optionally, in an embodiment, the second IGW port is different from the first IGW port, and the determining a third delay of a third path includes: obtaining a fifth two-way delay of a fifth two-way path, where the fifth two-way path successively passes through the second IGW port, the OTT server, the first IGW port, the provider/provider edge device, and the second IGW port; and obtaining a seventh one-way delay from the provider/provider edge device to the second IGW port, where the third delay $D_3$ is determined by using the following formula:

$$D_3 = M_5 - S_7 - S_5, \quad \text{(formula 2.1)}$$

where $M_5$ represents the fifth two-way delay, $S_7$ represents the seventh one-way delay, and $S_5$ represents the fifth one-way delay.

Optionally, in another embodiment, the second IGW port is the same as the first IGW port, and the determining a third delay of a third path includes: obtaining a sixth two-way delay of a sixth two-way path, where the sixth two-way path successively passes through the first IGW port, the OTT server, and the first IGW port; and determining that the sixth two-way delay is the third delay.

Further, the method may further include: sending the delay relationship to a network policy control device, so that the network policy control device determines a routing path of a data packet according to the delay relationship.

A starting position and an ending position of each two-way path mentioned in this embodiment of the present invention are the same. A two-way delay indicates a delay of a measured packet passing through the entire two-way path.

A one-way path mentioned in this embodiment of the present invention is from a starting position to an ending position, and the starting position is different from the ending position. In addition, the one-way path does not pass through other network elements or nodes except for the starting position and the ending position. The one-way delay refers to a delay of a one-way path. It may be understood that the "other network elements or nodes" mentioned herein refer to network elements or nodes that are involved in this specification of the present invention, including: the OTT server, the IGWs, and the IGW interfaces.

If it is not clear whether a starting position and an ending position of a path are the same, the path in this embodiment of the present invention is directly referred to as "path", for example, the first path, and the third path. A delay of a corresponding path is directly referred to as "delay". For example, a delay of the first path is the first delay, and a delay of the third path is the third delay.

To help a person skilled in the art better understand the present invention, the following describes the present invention with reference to a specific embodiment. It should be understood that this specific embodiment is only intended to help understand the technical solutions of the present invention, but not intended to limit the technical solutions of the present invention.

FIG. 3 is a schematic diagram of an all-IP network system. The system 300 shown in FIG. 3 includes an OTT server 301, an IGW 310, an IGW 320, an IGW 330, a P/PE device 340, a performance analysis device 360, a network policy control device 350, and a smart network controller (SNC) 370, where the IGW 310 has an interface 311 and an interface 312, the IGW 320 has an interface 313, and the IGW 330 has an interface 314.

The performance analysis device 360 may determine a delay relationship, that needs to be required, between one-way delays from the OTT server 301 to IGW interfaces. In this case, the performance analysis device 360 needs to obtain a delay of a particular two-way path, so as to determine the delay relationship between the one-way delays from the OTT server 301 to the IGW interfaces according to the delay of the particular two-way path. Specifically, to obtain the delay relationship between the one-way delays from the OTT server 301 to the IGW interfaces, a departure interface of a measured packet may be fixed and the measured packet may be returned from different interfaces. For example, the performance analysis device 360 may need two-way delays of four two-way paths shown in Table 1.

TABLE 1

| Sequence number | Path | Delay |
| --- | --- | --- |
| 1 | interface 311 -> OTT server 301 -> interface 311 | $Q_1$ |
| 2 | interface 311 -> OTT server 301 -> interface 312 -> IGW 310 -> P/PE device 340 -> IGW 310 -> interface 311 | $Q_2$ |
| 3 | interface 311 -> OTT server 301 -> interface 313 -> IGW 320 -> | $Q_3$ |

TABLE 1-continued

| Sequence number | Path | Delay |
|---|---|---|
| 4 | P/PE device 340 -> IGW 310 -> interface 311<br>interface 311 -> OTT server 301 -> interface 314 -> IGW 330 -><br>P/PE device 340 -> IGW 310 -> interface 311 | $Q_4$ |

Optionally, in an embodiment, the performance analysis device 360 may send, by using a request message, paths whose delays needing to be obtained to the network policy control device 350. The network policy control device 350 may determine a corresponding route according to the request message, and send routing information to a smart measurement device located on each IGW interface by using the SNC 370. The smart measurement device on each IGW interface may determine a two-way delay of a corresponding path according to the routing information. Specifically, protocols that are supported by a device managed by an operator and an OTT server may be not the same. Therefore, a two-way delay measurement may be implemented by using the smart measurement device located on the IGW interface. The smart measurement device (for example, a Huawei atom router) may determine the two-way delays of the four paths shown in Table 1 by using a particular measurement technology (for example, network quality analysis (NQA) and Internet Protocol flow performance measurement (IP FPM)).

Specifically, if the routing information of the paths shown in Table 1 is obtained, the smart measurement device on the IGW port may determine a time point at which the measured packet is sent and a time point at which the packet is received, and determine a delay of a two-way path according to the time point at which the packet is sent and the time point at which the packet is received. For example, the smart measurement device located on the interface 311 may control the measured packet to be sent from the interface 311 and returned to the interface 311 along a path 1, determine a departure time point and a returning time point of the measured packet, and determine a delay $Q_1$ of a two-way path of the path 1 according to the departure time point and the returning time point of the measured packet. In the same way, the smart measurement device located on the interface 311 may further control the measured packet to be sent from the interface 311 and returned to the interface 311 along a path 2, determine a departure time point and a returning time point of the measured packet, and determine a delay $Q_2$ of a two-way path of the path 2 according to the departure time point and the returning time point of the measured packet. Similarly, the smart measurement device located on the interface 311 may further determine delays of two-way paths of path 3 and a path 4.

After determining a two-way path, a smart measurement device located on an interface may send the two-way measured path to an SNC-A ( ) and the SNC-A may be located on the P/PE device 340. The SNC-A may be further configured to manage the smart measurement device. The performance analysis device 360 may obtain a corresponding two-way measured path from the SNC-A located on the P/PE device 340.

The performance analysis device 360 may further obtain a one-way delay between an IGW and the P/PE device. The P/PE device and the IGW may not support the same measurement manner. Therefore, the performance analysis device 360 possibly cannot directly determine the one-way delay between the P/PE device and the IGW. However, a smart measurement device (for example, a Huawei atom router) may determine the one-way delay between the P/PE device and the IGW by using a particular measurement technology (for example, NQA and IP FPM). Therefore, the performance analysis device 360 may obtain a one-way delay from each IGW to the P/PE device by using the smart measurement device located on each IGW. Similar to the two-way delay, after obtaining a one-way delay from the IGW to the P/PE device, the smart measurement device on the IGW may send the one-way delay to the SNC-A, and the performance analysis device 360 may obtain the one-way delay from the IGW to the P/PE device from the SNC-A. Table 2 is a one-way delay from each IGW to the P/PE device.

TABLE 2

| Sequence number | Path | Delay |
|---|---|---|
| 1 | IGW 310 -> P/PE device 340 | $Q_{310,340}$ |
| 2 | P/PE device 340 -> IGW 310 | $Q_{340,310}$ |
| 3 | IGW 320 -> P/PE device 340 | $Q_{320,340}$ |
| 4 | P/PE device 340 -> IGW 320 | $Q_{340,320}$ |
| 5 | IGW 330 -> P/PE device 340 | $Q_{330,340}$ |
| 6 | P/PE device 340 -> IGW 330 | $Q_{340,330}$ |

After obtaining the two-way delay and the one-way delay, the performance analysis device 360 may determine a delay relationship according to the two-way delay and the one-way delay.

Specifically, in an embodiment, a two-way path 2, that is, the interface 311→the OTT server 301→the interface 312→the IGW 310→the P/PE device 340→the IGW 310→the interface 311, may be considered as a superposition of a one-way path from the interface 311 to the OTT server 301, a one-way path from the OTT server 301 to the interface 312, a one-way path from the interface 312 to the IGW 310, a one-way path from the IGW 310 to the P/PE device 340, a one-way path from the P/PE device 340 to the IGW 310, and a one-way path from the IGW 310 to the interface 311. Therefore, a two-way delay $Q_2$ of the two-way path 2 is also a sum of a one-way delay of the one-way path from the interface 311 to the OTT server 301, a one-way delay of the one-way path from the OTT server 301 to the interface 312, a one-way delay of the one-way path from the interface 312 to the IGW 310, a one-way delay of the one-way path from the IGW 310 to the P/PE device 340, a one-way delay of the one-way path from the P/PE device 340 to the IGW 310, and a one-way delay of the one-way path from the IGW 310 to the interface 311. In the same way, a two-way path 1, that is, the interface 311→the OTT server 301→the interface 311, may be considered as a superposition of a one-way path from the interface 311 to the OTT server and a one-way path from the OTT server to the interface 311. Therefore, a two-way delay $Q_1$ of the two-way path 1 is also a sum of a one-way delay of the one-way path from the interface 311 to the OTT server and a one-way delay of the one-way path from OTT server to the interface 311. Therefore, a difference between the delays of the two-way path 1 and the two-way path 2 may be obtained by comparing the delays of the two-way path 1 and the two-way path 2. In addition, a delay between the IGW and the interface may be ignored. For example, because the interface 312 is an interface of the IGW 310, a delay of the interface 312→the IGW 310→the P/PE device 340 may be considered as a one-way delay between the IGW 310 and the P/PE device 340 or a one-way delay from the interface 312 to the P/PE device. Similarly, a delay of the P/PE device 340→the IGW 310→the interface 311 may be considered as a one-way delay from the P/PE device 340 to the IGW 310 or a one-way delay from the P/PE device 340 to the interface 311.

Similar to the one-way delay, for ease of description, $Q_{a,b}$ represents a one-way delay between a and b, and $Q_{b,a}$ represents a one-way delay between b and a. For example, $Q_{311,301}$ represents a one-way delay from the interface 311 to the OTT server 301, and $Q_{340,310}$ represents a one-way delay from the P/PE device 340 to the IGW 310. In this case, $Q_1$ and $Q_2$ may be respectively represented by using the following formulas:

$$Q_1 = Q_{311,301} + Q_{301,311}, \quad \text{(formula 3.1), and}$$

$$Q_2 = Q_{311,301} + Q_{301,312} + Q_{310,340} + Q_{340,310}, \quad \text{(formula 3.2)}$$

The delays of Table 1 and Table 2 may be both measured. Therefore, a delay of the interface 311→the OTT server 301→the interface 312 may be obtained according to the formula 3.2 and the one-way delays in Table 2, which may be specifically represented by using the following formula:

$$Q_{311,301,312} = Q_2 - Q_{310,340} - Q_{340,310} - Q_{311,301} + Q_{301,312}, \quad \text{(formula 3.3)}$$

where $Q_{a,b,c}$ represents a delay from a to b to c, that is, $Q_{311,301,312}$ represents a delay of the interface 311→the OTT server 301→the interface 312.

According to the formula 3.1 and the formula 3.3, a difference between the delays of the two-way path 1 and the interface 311→the OTT server 301→the interface 312 may be determined, and is specifically represented by using the following formula:

$$D_1 = Q_1 - Q_{311,301,312} - Q_{311,301} + Q_{301,311} - Q_{311,301} - Q_{301,312} - Q_{301,311} - Q_{301,312}, \quad \text{(formula 3.4)}$$

The difference between the one-way delay from the OTT server 301 to the interface 311 and the one-way delay from the OTT server 301 to the interface 312 is determined by using the formula 3.4. It may be determined whether the one-way delay from the OTT server 301 to the interface 311 is better or the one-way delay from the OTT server 301 to the interface 312 is better according to whether the difference is positive or negative. In other words, a delay relationship between the one-way delays from the OTT server 301 to the interface 311 and the interface 312 respectively may be determined according to the foregoing process.

It can be understood that the formula 3.4 is only an embodiment for determining the delay relationship between the one-way delay from the OTT server 301 to the interface 311 and the one-way delay from the OTT server 301 to the interface 312. A person skilled in the art may further determine the delay relationship between the one-way delay from the OTT server 301 to the interface 311 and the one-way delay from the OTT server 301 to the interface 312 by comparing $Q_1$ with $Q_{311,301,312}$ in another manner. For example, the delay relationship between the one-way delay from the OTT server 301 to the interface 311 and the one-way delay from the OTT server 301 to the interface 312 may be determined by directly comparing $Q_1$ with $Q_{311,301,312}$ according to the formula 3.1 and the formula 3.3. For another example, the delay relationship between the one-way delay from the OTT server 301 to the interface 311 and the one-way delay from the OTT server 301 to the interface 312 may be determined by using a ratio of $Q_1$ to $Q_{311,301,312}$.

In the same way, a delay relationship between one-way delays from the OTT server 301 to interfaces may be determined. Similarly, a delay relationship between one-way delays from the interfaces to the OTT server 301 may be determined by fixing a returning interface of a measured packet.

Similarly, the network policy control device 350 may further determine another interface as a fixing interface from which the measured packet departs, so as to determine the delay relationship between the one-way delays from the interfaces to the OTT server 301. Specific situations are similar to those in Table 1, and details are unnecessarily described herein.

Similarly, to determine a delay relationship between one-way delays from different IGW interfaces to the OTT server 301, the measured packet may be controlled to depart from different IGW interfaces and to be returned from a same IGW interface. Specific paths and delays obtained according to the paths are shown in Table 3.

TABLE 3

| Sequence number | Path | Delay |
|---|---|---|
| 5 | interface 311 -> OTT server 301 -> interface 311 | $Q_5$ |
| 6 | interface 312 -> OTT server 301 -> interface 311 -> IGW 310 -> P/PE device 340 -> IGW 310 -> interface 312 | $Q_6$ |
| 7 | interface 313 -> OTT server 301 -> interface 311 -> IGW 310 -> P/PE device 340 -> IGW 320 -> interface 313 | $Q_7$ |
| 8 | interface 314 -> OTT server 301 -> interface 311 -> IGW 310 -> P/PE device 340 -> IGW 330 -> interface 314 | $Q_8$ |

The performance analysis device 360 may determine the delay relationship between the one-way delays from the interfaces of the IGW to the OTT server according to the one-way delays in Table 2 and the two-way delays in Table 3.

Similarly, the network policy control device 350 may further determine another interface as a fixing interface to which the measured packet is returned, so as to determine the delay relationship between the one-way delays from the interfaces of the IGW to the OTT server. Specific situations are similar to those in Table 3, and details are unnecessarily described herein.

After obtaining the delay relationship between the one-way delays from the OTT server to the ports and the delay relationship between the ports to the OTT server, the performance analysis device 360 may send the delay relationships to the network policy control device 350. The network policy control device 350 may adjust, according to the delay relationships, services using different paths. For example, a route of the packet may be adjusted, and a service using a poorer path may be adjusted to a better path. For another example, a service that is used with a relatively high frequency may be adjusted to a relatively good path by adjusting a route of the packet according to a usage situation of the service.

It can be understood that the delay relationship between the one-way delays from the OTT server to the ports and the delay relationship from the ports to the OTT server that are obtained by the performance analysis device 360 may be expressed in form of delay ranks. The performance analysis device 360 may send the delay ranks to the network policy control device 350. The delay relationship between the one-way delays from the OTT server to the ports and the delay relationship from the ports to the OTT server that are obtained by the performance analysis device 360 may be further expressed in form of outputting a poorer path or a better path after comparing delays of two one-way paths to obtain a difference. Certainly, the delay relationship between the one-way delays from the OTT server to the ports and the delay relationship from the ports to the OTT server may be further expressed in another form, as long as the network policy control device 350 may determine delays or delay ranks of any two of multiple one-way paths according to this type of delay relationships.

Figure 4:
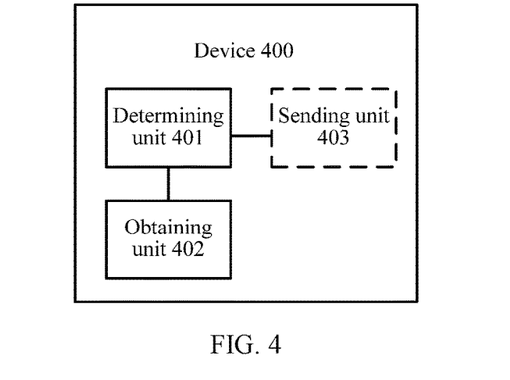
FIG. 4 is a structural block diagram of a delay measurement device according to an embodiment of the present invention.

FIG. 4 is a structural block diagram of a delay measurement device according to an embodiment of the present invention. As shown in FIG. 4, the device 400 includes a determining unit 401 and an obtaining unit 402.

The determining unit 401 is configured to determine a first delay of a first path, where the first path successively passes through a first Internet gateway IGW port, an over the top OTT server, and a second IGW port.

The obtaining unit 402 is configured to obtain a first two-way delay of a first two-way path, where the first two-way path successively passes through the first IGW port, the OTT server, a third IGW port, a provider/provider edge device, and the first IGW port, and the second IGW port is different from the third IGW port.

The obtaining unit 402 is further configured to obtain a first one-way delay from the third IGW port to the provider/provider edge device.

The obtaining unit 402 is further configured to obtain a second one-way delay from the provider/provider edge device to the first IGW port.

The determining unit 401 is further configured to determine a second delay, where the second delay is obtained by subtracting the first one-way delay and the second one-way delay from the first two-way delay.

The determining unit 401 is further configured to compare the first delay with the second delay, so as to determine a delay relationship between a one-way delay of a path from the OTT server to the second IGW port and a one-way delay of a path from the OTT server to the third IGW port.

The device 400 shown in FIG. 4 may effectively determine information about a delay relationship between delays from the OTT to different IGWs. A network policy control device may determine a path whose one-way delay is optimal according to the information about the delay relationship obtained by the device 400 shown in FIG. 4.

Optionally, in an embodiment, the first IGW port is different from the second IGW port. In this case, the obtaining unit 401 is further configured to: obtain a second two-way delay of a second two-way path, where the second two-way path successively passes through the first IGW port, the OTT server, the second IGW port, the provider/provider edge device, and the first IGW port, obtain a third one-way delay from the second IGW port to the provider/provider edge device, and obtain a fourth one-way delay from the provider/provider edge device to the second IGW port; and the determining unit 401 is specifically configured to determine the first delay $D_1$ by using the following formula:

$$D_1 = M_2 - S_3 - S_4, \quad \text{(formula 4.1)}$$

where $M_2$ represents the second two-way delay, $S_3$ represents the third one-way delay, and $S_4$ represents the fourth one-way delay.

Optionally, in another embodiment, the first IGW port is the same as the second IGW port. In this case, the obtaining unit 402 is further configured to obtain a third two-way delay of a third two-way path, where the third two-way path successively passes through the first IGW port, the OTT server, and the first IGW port. The determining unit 401 is specifically configured to determine that the third two-way delay obtained by the obtaining unit is the first delay.

Further, the device 400 may further include a sending unit 403, configured to send the delay relationship to a network policy control device, so that the network policy control device determines a routing path of a data packet according to the delay relationship.

Figure 5:
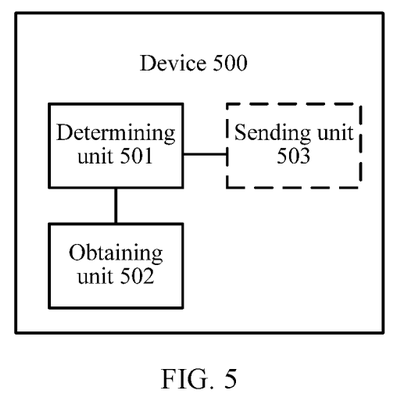
FIG. 5 is a structural block diagram of another delay measurement device according to an embodiment of the present invention.

FIG. 5 is a structural block diagram of another delay measurement device according to an embodiment of the present invention. As shown in FIG. 5, the device 500 includes a determining unit 501 and an obtaining unit 502.

The determining unit 501 is configured to determine a third delay of a third path, where the third path successively passes through a second Internet gateway IGW port, an over the top OTT server, and a first IGW port.

The obtaining unit 502 is configured to obtain a fourth two-way delay of a fourth two-way path, where the fourth two-way path successively passes through a third IGW port, the OTT server, the first IGW port, a provider/provider edge device, and the third IGW port, and the third IGW port is different from the second IGW port.

The obtaining unit 502 is further configured to obtain a fifth one-way delay from the first IGW port to the provider/provider edge device.

The obtaining unit 502 is further configured to obtain a sixth one-way delay from the provider/provider edge device to the third IGW port.

The determining unit 501 is further configured to determine a fourth delay, where the fourth delay is obtained by subtracting the fifth one-way delay and the sixth one-way delay from the fourth two-way delay.

The determining unit 501 is further configured to compare the third delay with the fourth delay, so as to determine a delay relationship between a one-way delay of a path from the second IGW port to the OTT server and a one-way delay of a path from the third IGW port to the OTT server.

The device 500 shown in FIG. 5 may effectively determine information about a delay relationship between delays from the OTT server to different IGWs. A network policy control device may determine a path whose one-way delay is optimal according to the information about the delay relationship obtained by the device 500 shown in FIG. 5.

Optionally, in an embodiment, the second IGW port is different from the first IGW port. In this case, the obtaining unit 502 is further configured to: obtain a fifth two-way delay of a fifth two-way path, where the fifth two-way path successively passes through the second IGW port, the OTT server, the first IGW port, the provider/provider edge device, and the second IGW port, and obtain a seventh one-way delay from the provider/provider edge device to the second IGW port. The determining unit 501 is specifically configured to determine the third delay $D_3$ by using the following formula:

$$D_3 = M_5 - S_7 - S_5, \qquad \text{(formula 5.1)}$$

where $M_5$ represents the fifth two-way delay, $S_7$ represents the seventh one-way delay, and $S_5$ represents the fifth one-way delay.

Optionally, in another embodiment, the second IGW port is the same as the first IGW port. In this case, the obtaining unit 502 is further configured to obtain a sixth two-way delay of a sixth two-way path, where the sixth two-way path successively passes through the first IGW port, the OTT server, and the first IGW port. The determining unit 501 is specifically configured to determine that the sixth two-way delay obtained by the obtaining unit is the third delay.

Further, the device 500 may further include a sending unit 503, configured to send the delay relationship to a network policy control device, so that the network policy control device determines a routing path of a data packet according to the delay relationship.

A person skilled in the art may understand that in actual deployment, the device 400 shown in FIG. 4 and the device 500 shown in FIG. 5 may be a same device. The device may be the performance analysis device 360 in the embodiment shown in FIG. 3. In addition, a person skilled in the art may understand that the methods disclosed in the foregoing embodiments of the present invention may be applied to a processor of the performance analysis device 360, or implemented by the processor of the performance analysis device 360. The processor of the performance analysis device 360 may be an integrated circuit chip having a signal processing capability. In an implementation process, each step of the foregoing methods may be completed by using an integrated logic circuit of hardware in the processor of the performance analysis device 360 or an instruction in a software form. The foregoing processor of the performance analysis device 360 may be a general purpose processor, a digital signal processor (DSP), an application specific integrated circuit (ASIC), a field programmable gate array (FPGA), or another programmable logic device, discrete gate or transistor logic device, or discrete hardware component. The processor may implement or execute methods, steps and logical block diagrams disclosed in the embodiments of the present invention. The general purpose processor may be a microprocessor or the processor may be any conventional processor or the like. Steps of the methods disclosed with reference to the embodiments of the present invention may be directly executed and completed by means of a hardware decoding processor, or may be executed and completed by using a combination of hardware and software modules in the decoding processor. The software module may be located in a storage medium that is mature in the art such as a random access memory (RAM), a flash memory, a read-only memory (ROM), a programmable read-only memory or an electrically erasable programmable memory, or a register. The storage medium is located in a memory of the performance analysis device 360, and the processor reads an instruction in the memory and completes the steps of the foregoing methods in combination with hardware of the processor. Data communication between the performance analysis device 360 and another device (for example, a network policy control device) may be implemented by using a transceiver circuit. In addition, components in the performance analysis device 360 may be coupled together by using a bus system, where the bus system further includes a power bus, a control bus, and a status signal bus in addition to a data bus.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A delay measurement method, wherein the method comprises:

determining a first delay of a first path, wherein the first path successively passes through a first Internet gateway (IGW) port, an over the top (OTT) server, and a second IGW port;

obtaining a first two-way delay of a first two-way path, wherein the first two-way path successively passes through the first IGW port, the OTT server, a third IGW port, a provider or provider edge device, and the first IGW port, and the second IGW port is different from the third IGW port;

obtaining a first one-way delay from the third IGW port to the provider or provider edge device;

obtaining a second one-way delay from the provider or provider edge device to the first IGW port;

determining a second delay, wherein the second delay is obtained by subtracting the first one-way delay and the second one-way delay from the first two-way delay; and comparing the first delay with the second delay, so as to determine a delay relationship between a one-way delay of a path from the OTT server to the second IGW port and a one-way delay of a path from the OTT server to the third IGW port.

2. The method according to claim 1, wherein the first IGW port is different from the second IGW port, and the determining a first delay of a first path comprises:

obtaining a second two-way delay of a second two-way path, wherein the second two-way path successively passes through the first IGW port, the OTT server, the second IGW port, the provider or provider edge device, and the first IGW port;

obtaining a third one-way delay from the second IGW port to the provider or provider edge device; and obtaining a fourth one-way delay from the provider or provider edge device to the second IGW port, wherein the first delay $D_1$ is determined by using the following formula:

$$D_1 = M_2 - S_3 - S_4,$$

wherein $M_2$ represents the second two-way delay, $S_3$ represents the third one-way delay, and $S_4$ represents the fourth one-way delay.

3. The method according to claim 1, wherein the first IGW port is the same as the second IGW port, and the determining a first delay of a first path comprises:

obtaining a third two-way delay of a third two-way path, wherein the third two-way path successively passes through the first IGW port, the OTT server, and the first IGW port; and determining that the third two-way delay is the first delay.

4. The method according to claim 1, wherein the method further comprises:

sending the delay relationship to a network policy control device, so that the network policy control device determines a routing path of a data packet according to the delay relationship.

5. A delay measurement method, wherein the method comprises:

determining a third delay of a third path, wherein the third path successively passes through a second Internet gateway (IGW) port, an over the top (OTT) server, and a first IGW port;

obtaining a fourth two-way delay of a fourth two-way path, wherein the fourth two-way path successively passes through a third IGW port, the OTT server, the first IGW port, a provider or provider edge device, and the third IGW port, and the third IGW port is different from the second IGW port;

obtaining a fifth one-way delay from the first IGW port to the provider or provider edge device;

obtaining a sixth one-way delay from the provider or provider edge device to the third IGW port;

determining a fourth delay, wherein the fourth delay is obtained by subtracting the fifth one-way delay and the sixth one-way delay from the fourth two-way delay; and comparing the third delay with the fourth delay, so as to determine a delay relationship between a one-way delay of a path from the second IGW port to the OTT server and a one-way delay of a path from the third IGW port to the OTT server.

6. The method according to claim 5, wherein the second IGW port is different from the first IGW port, and the determining a third delay of a third path comprises:

obtaining a fifth two-way delay of a fifth two-way path, wherein the fifth two-way path successively passes through the second IGW port, the OTT server, the first IGW port, the provider or provider edge device, and the second IGW port; and obtaining a seventh one-way delay from the provider or provider edge device to the second IGW port, wherein the third delay $D_3$ is determined by using the following formula:

$$D_3 = M_5 - S_7 - S_5,$$

wherein $M_5$ represents the fifth two-way delay, $S_7$ represents the seventh one-way delay, and $S_5$ represents the fifth one-way delay.

7. The method according to claim 5, wherein the second IGW port is the same as the first IGW port, and the determining a third delay of a third path comprises:

obtaining a sixth two-way delay of a sixth two-way path, wherein the sixth two-way path successively passes through the first IGW port, the OTT server, and the first IGW port; and determining that the sixth two-way delay is the third delay.

8. The method according to claim 5, wherein the method further comprises:

sending the delay relationship to a network policy control device, so that the network policy control device determines a routing path of a data packet according to the delay relationship.

9. A delay measurement device, wherein the device comprises:

a memory to store instructions; and a processor to execute the instructions to configure the delay measurement device to:

determine a first delay of a first path, wherein the first path successively passes through a first Internet gateway (IGW) port, an over the top (OTT) server, and a second IGW port; and obtain a first two-way delay of a first two-way path, wherein the first two-way path successively passes through the first IGW port, the OTT server, a third IGW port, a provider or provider edge device, and the first IGW port, and the second IGW port is different from the third IGW port;

obtain a first one-way delay from the third IGW port to the provider or provider edge device;

obtain a second one-way delay from the provider or provider edge device to the first IGW port;

determine a second delay, wherein the second delay is obtained by subtracting the first one-way delay and the second one-way delay from the first two-way delay; and compare the first delay with the second delay, so as to determine a delay relationship between a one-way delay of a path from the OTT server to the second IGW port and a one-way delay of a path from the OTT server to the third IGW port.

10. The device according to claim 9, wherein the first IGW port is different from the second IGW port, and the device is further configured to: obtain a second two-way delay of a second two-way path, wherein the second two-way path successively passes through the first IGW port, the OTT server, the second IGW port, the provider or provider edge device, and the first IGW port, obtain a third one-way delay from the second IGW port to the provider or provider edge device, and obtain a fourth one-way delay from the provider or provider edge device to the second IGW port; and the device is configured to determine the first delay $D_1$ by using the following formula:

$$D_1 = M_2 - S_3 - S_4,$$

wherein $M_2$ represents the second two-way delay, $S_3$ represents the third one-way delay, and $S_4$ represents the fourth one-way delay.

11. The device according to claim 9, wherein the first IGW port is the same as the second IGW port, and the device is further configured to obtain a third two-way delay of a third two-way path, wherein the third two-way path successively passes through the first IGW port, the OTT server, and the first IGW port; and the device is configured to determine that the third two-way delay obtained by the obtaining unit is the first delay.

12. The device according to claim 9, wherein the device is further configured to send the delay relationship to a network policy control device, so that the network policy control device determines a routing path of a data packet according to the delay relationship.

* * * * *